US006948059B1

(12) United States Patent
Sprecher et al.

(10) Patent No.: US 6,948,059 B1
(45) Date of Patent: Sep. 20, 2005

(54) COMPONENT LOADER FOR INDUSTRIAL CONTROL DEVICE PROVIDING RESOURCE SEARCH CAPABILITIES

(75) Inventors: Reginald W. Sprecher, Waukesha, WI (US); Thomas L. Heidebrecht, Cambridge, WI (US); David E. Thomas, Germantown, WI (US); Daniel E. Leising, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 461 days.

(21) Appl. No.: 09/670,926

(22) Filed: Sep. 28, 2000

(51) Int. Cl.$^7$ ................................................ G06F 9/00
(52) U.S. Cl. ...................... 713/100; 713/1; 717/168; 717/170
(58) Field of Search .................... 713/1, 2, 100; 717/168, 169, 174, 175, 170

(56) References Cited

U.S. PATENT DOCUMENTS

| | | | | |
|---|---|---|---|---|
| 5,548,759 | A | * | 8/1996 | Lipe ............................ 707/100 |
| 5,793,979 | A | * | 8/1998 | Lichtman et al. ............ 709/226 |
| 5,794,032 | A | * | 8/1998 | Leyda ............................ 713/2 |
| 5,802,590 | A | * | 9/1998 | Draves ........................ 711/164 |
| 5,870,610 | A | * | 2/1999 | Beyda ......................... 717/173 |
| 6,202,207 | B1 | * | 3/2001 | Donohue ..................... 717/173 |
| 6,353,928 | B1 | * | 3/2002 | Altberg et al. ............... 717/175 |
| 6,438,749 | B1 | * | 8/2002 | Chamberlain ................ 717/174 |
| 6,442,754 | B1 | * | 8/2002 | Curtis .......................... 717/175 |
| 6,467,088 | B1 | * | 10/2002 | alSafadi et al. .............. 717/173 |

FOREIGN PATENT DOCUMENTS

JP        08149208 A   *   6/1996   ............ H04M 3/42

OTHER PUBLICATIONS

"Device Drivers via the Access Bus", IBM Technical Disclosure Bulletin, Jan. 1, 1996, US, pp. 135-136.*

* cited by examiner

*Primary Examiner*—Lynne H. Browne
*Assistant Examiner*—Paul Yanchus, III
(74) *Attorney, Agent, or Firm*—Quarles & Brady LLP; Alexander M. Gerasimow

(57) ABSTRACT

The installing of components into an industrial computer observes a pulling paradigm in which a required resource list associated with each component is reviewed against resources in the target-industrial control device. Missing resources are obtained through a searching process that may include but is not limited to the media holding or associated with the installed component. This approach allows compatibility between different versions of the resources to be evaluated with the possibility of coexisting different version numbers being, or one version replacing the other for automatic upgrade. Collecting the resources in a available resource table allows more complete information to be provided to the user in the event the resource cannot be found and allows more complete removal of components by making an explicit attribution of ownership of each resource to one or more installed components.

31 Claims, 3 Drawing Sheets

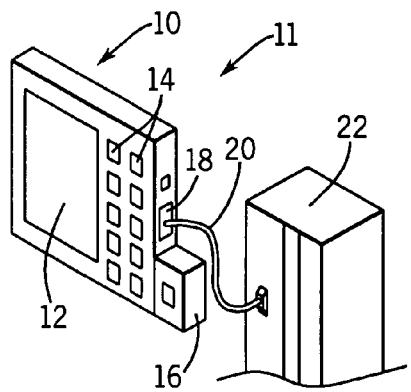
FIG. 1
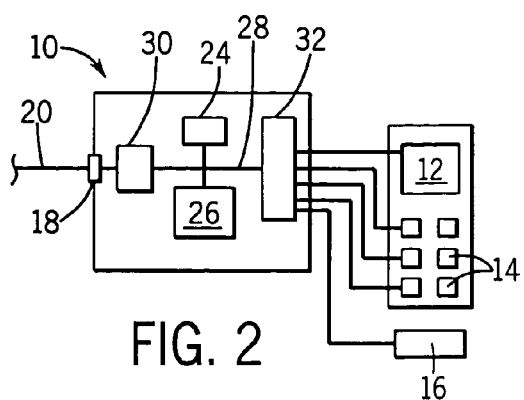
FIG. 2
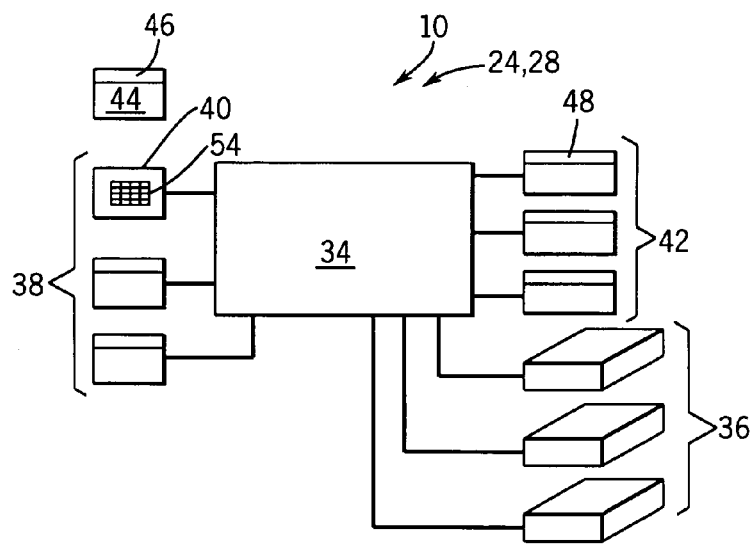
FIG. 3
FIG. 4
| TYPE | IDENTIFIER | VERSION | COMPATIBILITY | OWNERSHIP |
|---|---|---|---|---|
| AB CAT#1011 | BP. DLL | 2.0 | 1.5, 1.4 | APP.1 |
| VIDEO DRIVER 300X300 | VD300. DRV | 3.2 | — | APP.1, APP.2 |
| WWW. DRV. COM | VD40. DRV | 4.1 | 2.5-4.0 | APP.3 |
| CAT# 1256 | AB 155 | 1.0 | — | APP.1 |

COMPONENT LOADER FOR INDUSTRIAL CONTROL DEVICE PROVIDING RESOURCE SEARCH CAPABILITIES

CROSS-REFERENCE TO RELATED APPLICATIONS

--

STATEMENT REGARDING FEDERALLY SPONSORED RESEARCH OR DEVELOPMENT

--

BACKGROUND OF THE INVENTION

The present invention relates to a program that installs other program or hardware components onto an industrial control device and, in particular, to a loader program that searches for missing resources needed by the components to be installed.

Industrial controllers are special-purpose computers used for controlling industrial processes and manufacturing equipment. Under the direction of a stored program, the industrial controller examines a series of inputs reflecting the status of the controlled process and changes the series of outputs controlling the industrial process. The inputs and outputs may be binary, that is on or off, or analog providing a value within a continuous range of values.

In the past industrial controllers had relatively fixed software and hardware configurations. By limiting changes in the configuration of the industrial controller and its subsystems, high reliability was obtained.

In contrast, in the area of personal computers, a much larger range of software and hardware configurations is tolerated. Such variation is accommodated by requiring the manufacturer of a component (hardware or software) to package the component together with all of their necessary program resources, for example, executables, drivers and linkable libraries, needed by the component. The manufacturer is also required to provide an install program that will install these resources on the target computer.

A number of problems arise with this latter approach. First, the component to be installed must be packaged with all necessary program resources even if it is expected that some or all of these resources will already be on the target computer. Second, the installer must typically load all or many of the associated resources onto the target computer whether they are required or not, as most install programs have limited ability to detect the resources already in place.

"Pushing" resources onto the target control device can create havoc with existing components that share the resources, particularly when new versions of existing resources are loaded over old versions with the same name. In many cases, an older resource will work differently or will have functions no longer supported in the new version. Many or most of the resources will not be needed for a particular installation, unnecessarily burdening the delivery of the component to the target computer.

If a critical resource is not available, the operating system will notify the user when the component is run, but the information is limited to a cryptic message about a required file not being found.

BRIEF SUMMARY OF THE INVENTION

The present invention provides for a more systematic way of installing new hardware or software into an industrial controller. In the invention, components, which may be hardware and or software, carry with them a "required resource list" indicating the necessary resources (hardware and/or software) necessary for them to execute. This list is compared to the resources already present on the control device (using an "available resource table") and missing resources only are "pulled" onto the control device from a variety of sources.

Having the control device "pull" resources onto it on an "as needed" basis, versus having the loaded program "push" all its resources onto the control device, allows more sophisticated resource management in which the control device seeks the resources from other sources than, for example, a source (e.g., a disk) associated with the component being installed. Multiple versions of resources may be compared for compatibility, with one resource replacing the other, or two resources co-existing depending on that compatibility.

This "pulling" approach of the present invention is enabled by an "available resource table" maintained by the industrial control device and listing the resources of the industrial control device and compatibility of those resources. This information is linked with or derived from the resources when they are first installed. The available resource table also allows for information about ownership of the resources to be centrally collected allowing much more complete and systematic de-installation of programs when components must be removed.

Specifically, the present invention provides a method of adding a component into a target industrial control device where the industrial control device includes a set of resources used by components and having types and version numbers. In the method, a required resource list is generated of types and version numbers of resources required by the component and this required resource list is linked to the component. A loader program, typically on the target industrial control device, then compares the required resource list with available resources on the target industrial control device.

When all the resources on the required resource list can be found on the target industrial control device, including the types and version numbers of those resources, the component is added to the industrial control device. On the other hand, when less than all the required resources are found on the target industrial control device, the loader program determines types and version numbers of the missing resources and searches for the missing resources according to a predefined search strategy. The component being installed can be software or hardware with associated files.

Thus it is one object of the invention to avoid the downloading of redundant resources to the target industrial control device. By having each component, for example, and application program, list its required resources, a more selective downloading of resources can be managed.

It is another object of the invention to avoid the burden of storing all necessary resources with the component to be loaded. By organizing the downloading process from the point of view of the target industrial control device, existing resources can be tapped for use with the component as found in directories other than the source directory associated with the component or a predesignated common directory of the target industrial control device.

When the missing resources cannot be found, the type and version number of the missing resources may be reported to the user.

Thus it is another object of the invention to provide the user with greater information about missing resources beyond the file name. The required resource list can provide information about required resources beyond simply the file name of the missing resource.

The resources may be hardware or resources necessary for execution of the component.

Thus it is another object of the invention to extend the process of checking for resources to include hardware necessary for the application program.

For locating missing resources, the predefined search strategy may begin with the search of a logical address of the source of the component and/or may include searching at least one predetermined network location.

Thus it is another object of the invention to empower the target industrial control device to find the necessary resources starting with the media on which the component or portions of the component are located but extending to a logical network and even the Internet.

When a missing resource found during the search strategy is a resource having a type, but not a version identical to a corresponding resource in the target control device, the method may add the missing resource to the industrial control device without removing the corresponding resource. These two resources may coexist without conflict, for example, by loading the corresponding resource in a common directory and the new resource in a directory unique to the component.

Thus it is another object of the invention to provide a more sophisticated loading process where two resources may be identical except for version number. By providing separate version number information, this subtlety may be detected and two versions may be allowed to coexist through the use of separate files or the like.

The method may include a step of determining upward compatibility between different version numbers of resources of a given type where upward compatibility means that the resource of a later version number fully supports the features of a resource with an earlier version number. This information about compatibility may be linked to the resources. When a missing resource is a resource having a type identical with a corresponding resource in the target industrial control device, but a later version number, the method may replace the corresponding resource with the missing resource only when the missing resource is upwardly compatible with the corresponding resource.

Thus it is another object of the invention to provide for sophisticated replacement of resources and upgrading of those resources without risk to functionality of previously installed components.

The set of resources may be listed in an available resource table held in the industrial control device collected by polling the devices or by manual entry or during the enrollment of different application programs.

Thus it is another object of the invention to provide flexible methods of determining the resources available to the industrial control device.

The available resource table may include a listing of components using each resource. These components may be identified, for example, as components are added to the industrial control device. The method may further include the steps of accepting a "component deletion instruction" to delete the component from the industrial control device and to review the available resource table to find all the resources associated with the component. These resources are deleted unless the available resource table indicates a component other than the component being deleted is in the listing of components using the resource. The deleted component may be eliminated from all references of the available resources table.

Thus it is another object of the invention to clearly distinguish between shared and unshared resources even when they share the same directory. The user may be advised not only that a given resource is shared, but what other components have ownership of the resource to provide for more complete component removal.

The foregoing and other objects and advantages of the invention will appear from the following description. In this description, reference is made to the accompanying drawings, which form a part hereof, and in which there is shown by way of illustration, a preferred embodiment of the invention. Such embodiment and its particular objects and advantages do not define the scope of the invention, however, and reference must be made therefore to the claims for interpreting the scope of the invention.

BRIEF DESCRIPTION OF THE DRAWINGS

FIG. 1 is a fragmentary perspective view of an industrial control device such as may be used with the present invention showing various hardware subsystems of the panel including a connection to a network;

FIG. 2 is a simplified schematic representation of the industrial control device of FIG. 1 showing a processor and memory communicating with the various hardware subsystems;

FIG. 3 is a block representation of the hardware and resources of the control device of FIG. 1, the latter held in the memory of FIG. 2, as coordinated by an operating system, and showing an application program loaded into the control device;

FIG. 4 is a tabular representation of an available resource table such as is generated and used by the present invention to evaluate required resource lists associated with new application programs;

DETAILED DESCRIPTION OF THE INVENTION

Figure 5:
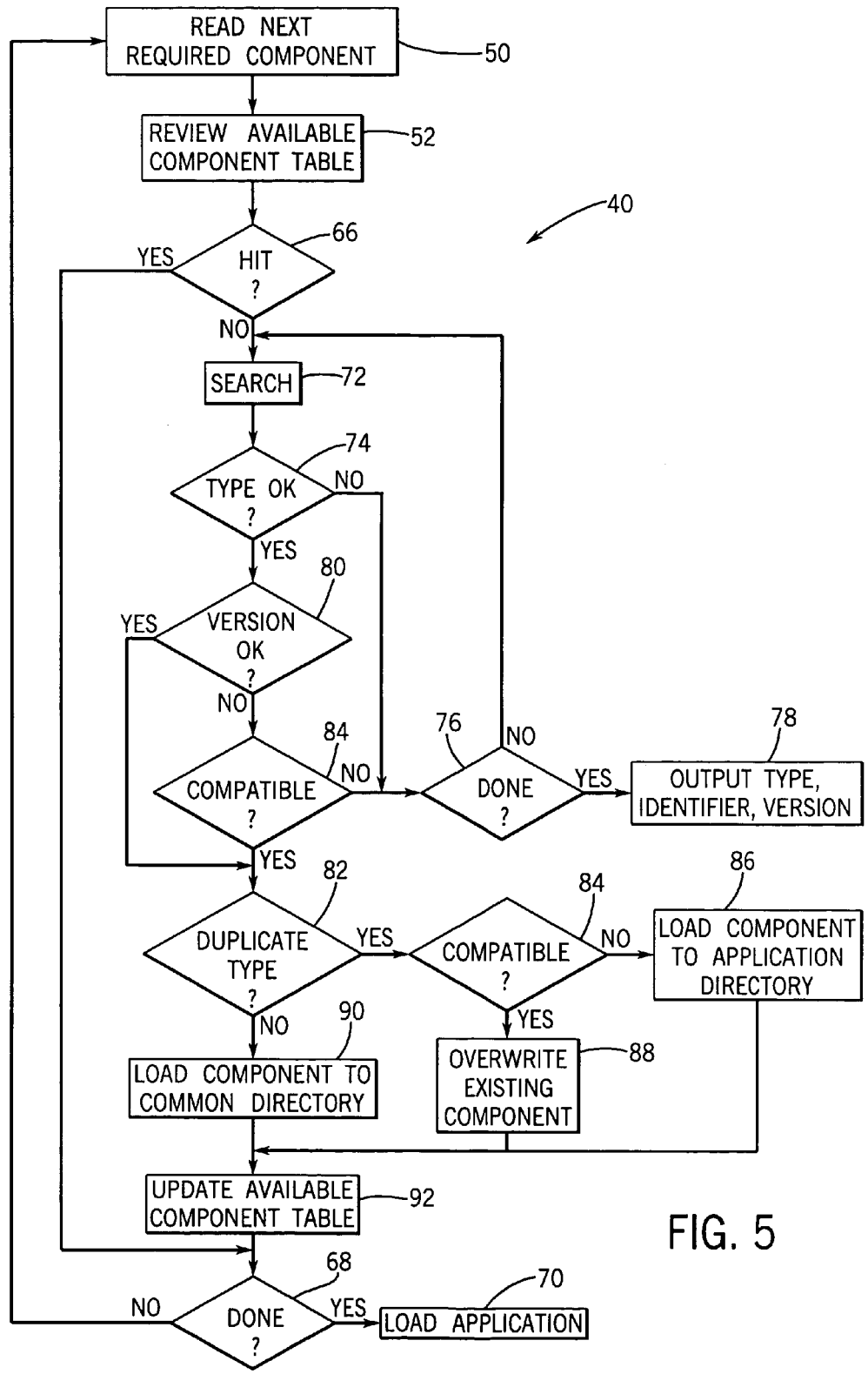
FIG. 5 is a flow chart showing operation of a program implementing the present invention in adding a new program to the control device.

Referring now to FIG. 1, a human machine interface (HMI) 10 forming part of an industrial control system 11 may include a graphics display panel 12 and a set of associated push buttons 14. The HMI 10, like many industrial control devices, includes a provision for adding expansion hardware 16, for example, a finger print reader, as well as a port 18 for communication between the HMI 10 and a general purpose industrial control network 20. The control network 20 allows communication between the HMI 10 and other subsystems 22 of the industrial control system 11 such as may include an industrial controller and various bridges to other networks including the Internet. The HMI 10 thus represents a general industrial control device and stands as an example of a variety of different industrial control devices to which the present invention is applicable.

Referring now to FIG. 2, the HMI 10 may employ a general computer architecture having a processor 24 and associated memory 26 connected to each other by an internal bus 28. The bus 28 may also be connected to a network interface 30 communicating with the network port 18 and ultimately with the network 20. A hardware interface 32 may communicate with the various hardware resources of the graphics display panel 12, push buttons 14 and expansion hardware 16.

Referring now to FIG. 3, the processor 24 and memory 26 provide for the execution of an operating system 34 such as provides interface between various hardware resources 36 including, in this example, the push buttons 14, the network interface 30, graphics display panel 12 and expansion hardware 16. The operating system 34 also provides an interface between various software resources 42 such as drivers, data files, and dynamically linked program extensions that are used by the software components 38.

Software components 38 may include the loader/de-loader program 40 of the present invention as well as application programs implementing functions of the HMI 10. Generally, components may be distinguished from resources in that resources do not rely on components to run, whereas components do require resources to run. This distinction need not be preserved, however, especially between hardware components and software components. That is, software components can require hardware components to run. Thus as used herein, therefore, "component" will generally refer to elements of the industrial controller that are being added (hardware or software), and "resources" will be those elements required by at least one component.

The operating system 34 may manage the execution of the software components 38 loaded into the HMI 10 according to methods well known in the art.

In the present invention, a new software components 44 to be loaded must previously have been linked to a required resource list 46 listing the hardware resources 36 and/or software resources 42 that are used by the new software components 44. This linking may be through a header actually incorporated into the code of the new software components 44 or may be a separate file associated with the new software components 44, for example, by being in a common source directory or by having a common file name element.

The required resource list 46 in the preferred embodiment includes a human readable description of each required resource, a unique identifier of the resource type and a version number. Typically, the unique identifier will be a file name as will be understood to those of ordinary skill in the art.

Similarly, each new software resource 42 to be loaded (for example as required by a new software components 44) must previously have been linked to a compatibility list 48 which like the required resource list 46 provides a unique identifier for the software resource 42 (such as a file name), a version number and an indication of the compatibility of that particular resource with then pre-existing versions of that software resource 42. Thus, for example, a version 2.0 of a software resource 42 may indicate that it is upwardly compatible with resource 1.1 and but not upwardly compatible with resource 1. "Compatible" means that version 2.0 will provide all the functions (and perhaps more) than versions 1.1 and on, but may omit some functions of version 1.0. "Upwardly" means the reverse is not necessarily true, that version 1.1 will not provide all the functions of version 2.0.

Thus the software components 38 using resource version 1.1, can equally use version 2.0 (if version 2.0 indicates that it is upwardly compatible) whereas software components 38 using resource version 1.0 would not be able to use version 2.0. This compatibility list 48 is also linked to the software resource 42 in a manner similar to that described with respect to required resource list 46 and new software components 44. The unique identifier of the software resource 42 and the version number may be incorporated into the file name of the software resource 42 or may be separately linked data.

The required resource list 46 and compatibility list 48 are generally determined by the programmer developing the components 38 and resources 42 and manually added at the time of their generation. Automatic techniques of scanning a software components 44 to determine its required resources is not precluded, however, by the present invention.

Referring now to FIG. 4, the loader/de-loader program 40 of the present invention includes an available resource table 54 listing all the software resources 42 and hardware resources 36 available to the operating system 34 in the HMI 10. In the preferred embodiment, the available resource table 54 lists for each resource (shown as a row) a number of attributes (shown as columns). The first attribute is a type 56 indicating a human readable generic type of the resource. Any sort of information can be placed here as this attribute is intended to provide a basis of a message to the user in the event that the resource cannot be found. Thus this information may be a description of the purpose or function of the resource or a catalog number or the like or a source for finding the resource.

A next attribute is a unique identifier 58 for the resource in a form suitable for computer processing. For software resources 42, this identifier 58 may be simply a file name for the particular resource. For hardware resources 36, the identifier may be an embedded firmware code in the particular piece of hardware.

The next attribute is version number 60 reflecting slight variations in the resources such as result from resource evolution and improvements.

The next attribute is a compatibility 62 reflecting those other versions that have upward compatibility with the present version. This is the same data provided by the compatibility list 48 of the software resources 42 described above, and provides storage for this information after the software resource 42 is loaded.

A final attribute indicates ownership 64 of the resource such as will be described below but which generally provides an historical record of which software components 38 had which software resources 42 in their required resource lists 46.

Each of the attributes 56 through 62 are derivable directly from the software resources 42 and their compatibility list 48 or firmware or of the hardware resources 36 (which may be similarly structured) and thus the available resource table 54 may be easily constructed by adding entries as different software resources 42 or hardware resources 36 are enrolled as will be described below. The available resource table 54 is depicted as a single table, however, it will be understood from the following description, that the available resource table 54 may also be constructed dynamically as needed by reviewing the hardware resources 36 and software resources 42 and stored versions of their compatibility lists 48 as needed.

The following will describe the addition of a software component 44, however, this description is equally applicable to hardware components as will be understood to one of ordinary skill in the art.

Referring now to FIGS. 3 and 5, at the time the new software components 44 is to be added, the loader/de-loader program 40 is invoked and as indicated by process block 50, the loader/de-loader program 40 reads the required resource list 46 from the new software components 44 to determine a first resource on that list. That resource, at process block 52, is then compared to each row of an available resource table at process block 52.

If the resource needed is in the available resource table 54, then at decision block 66, the program branches to decision block 68 to see if all of the resources listed in the required resource list 46 had been accounted for. If so, the program proceeds to process block 70 and that software components 44 is loaded into the HMI 10 per conventional techniques.

Referring again to decision block 66, if the particular resource needed in the required resource list 46 is not found in the available resource table 54, and the resource is a software resource 42, then the loader/de-loader program 40 proceeds to process block 72 to begin a search for the particular resource. A number of search strategies may be used, however, in the preferred embodiment, the initial search for the resource examines the source file of the new software components 44 to see if the resource has been bundled with the new software components 44. The source file may be physical media, such as a disk, or a network address.

If the software resource 42 is not found with the new software components 44, the search may then be extended to other files, following a predefined sequence of logical drives and network file locations available to the HMI 10 ultimately concluding in one or more predetermined Internet addresses such as may be stored in the loader/de-loader program 10 or obtained from the required resource list 46. In one embodiment, a URL address of a manufacturer of the HMI 10 may be provided and the manufacturer may maintain a clearinghouse of necessary resources.

As resources are uncovered in the searching sequence of process block 72, their types are checked at decision block 74. If the type does not match the desired type of the resource of required resource list 46, then the program proceeds to decision block 76 to see if the search has been concluded. If it has, then at process block 78, the search is a failure but the user is given information as to the type 56, identifier 58 and version number 60 of the desired resource so that they have the best possible information for obtaining it independently.

More typically, at decision block 76, the search will not be complete and the program loops back to process block 72 to continue the search along the search strategy described above. If at decision block 74, the type of the resource found is one that matches the desired resource, then at decision block 80, its version is checked. If the version of the found resource is identical to that desired, then the program proceeds to process block 82 as will be described below.

If on the other hand, the version of the found resource does not match the desired version number but is higher than the desired version, then the program proceeds to process block 84 and the compatibility of the found resource is checked (via its compatibility list 48) to see whether it has upward compatibility with the desired version number. If so, the program proceeds to decision block 82 as before; if not, it branches to decision block 76 and the search is continued.

At decision block 82, where the resource has been found, it is checked to see whether there is a pre-existing resource of the same type already enrolled with the operating system 34 as indicated by the available resource table 54. Because at process block 52, the available resource table 54 has already been checked, such a duplication can only occur if a different version number of the resource is in existence. If so, then at decision block 84, its compatibility is checked.

If the pre-existing resource is not upwardly compatible with the new resource, then the program proceeds to process block 86 and the new resource is added to a directory in which the new software components 44 is loaded. The operating system 34 may, when called on by software components 38 for particular resources, check the directory of the application program before checking a common directory for the particular resource. Thus both resources may co-exist without conflict. It will be understood that other methods of segregating the resources for unambiguous use by different applications may be used for different types of operating systems.

If at decision block 84, there is upward compatibility with a pre-existing resource, then the pre-existing resource is overwritten as indicated by process block 88.

If at decision block 82 there was no pre-existing resource, then the new resource is located and written to a common area of the memory used by the operating system for such resources as indicated by process block 90.

In each case of process blocks 86, 88 and 90, the program then proceeds to process block 92 and the available resource table 54 is updated with the information about the loaded resource taken from the compatibility list 48 and in the case of ownership 64 derived from the context of the loading. The owner is the name of the application program that requested the resource in its required resource list 46. As may be seen from FIG. 4, there may be multiple owners of a given resource. This attribute of ownership 64 may be used to effectively remove components as will now be described and as may also be performed by loader/de-loader program 40.

At this time, the program proceeds to process block 68 to see if the resources have all been accounted for as has been described above. If not the program loops back to process block 50 and the next resource is investigated. If so, the program proceeds to process block 70 as has been described above.

Figure 6:
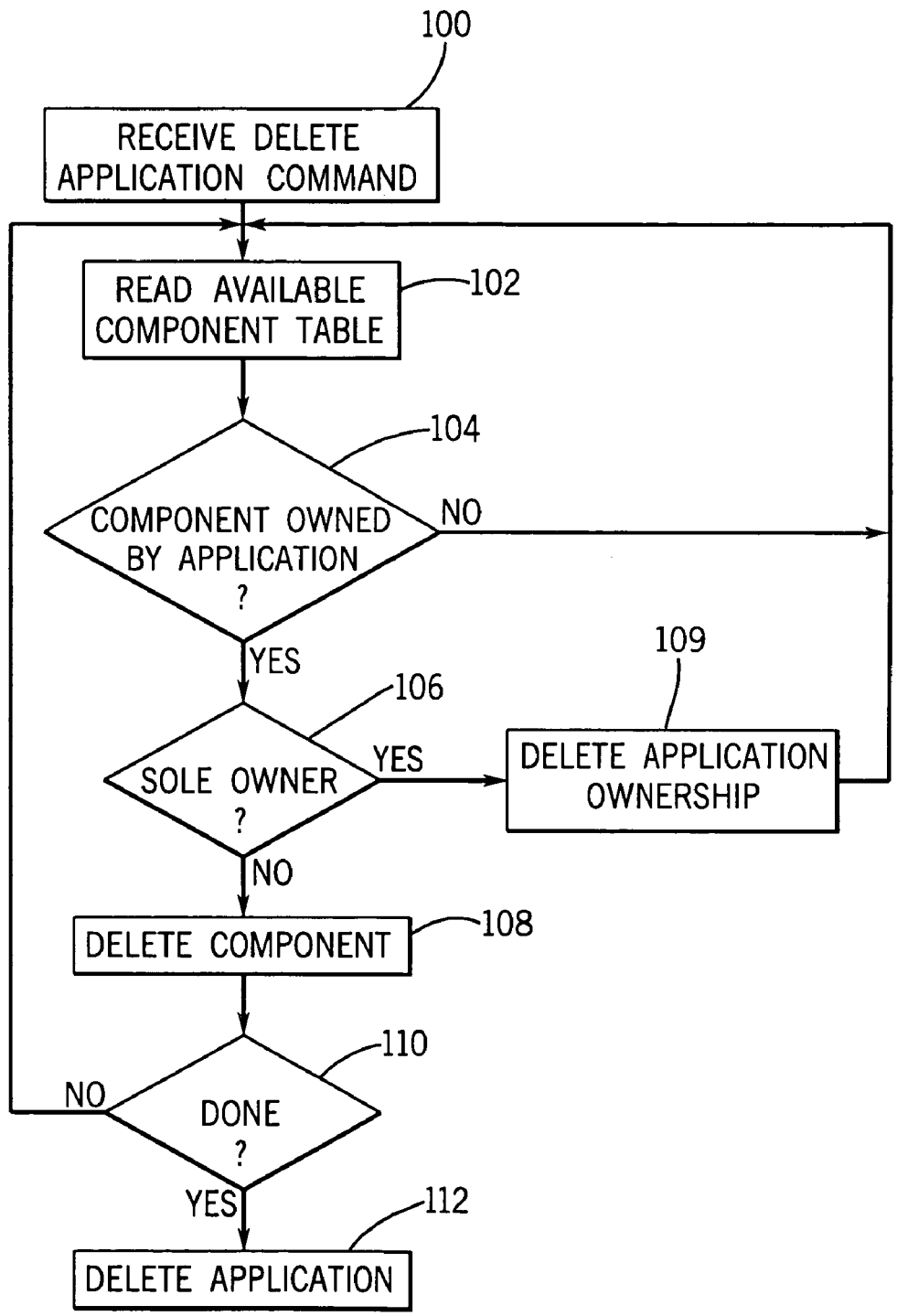
FIG. 6 a flow chart showing operation of a program implementing the present invention in deleting a program to the control device.

Referring now to FIG. 6, at process block 100, the user may provide a command to the loader/de-loader program 40 identifying a particular software component 38 (or hardware component) to be removed. The loader/de-loader program 40 may then provide the user with a view of the list of resources 42 and 36 owned solely by that component.

Specifically, at process block 102, a first row of the available resource table 54 is read. At decision block 104, the ownership 64 is checked to see whether the resource of that row is owned by the particular component being deleted. If not, the program proceeds back to read the next row at process block 102. If the software component 38 to be deleted owns the resource of the row, however, the program proceeds to decision block 106 to see if the particular component being deleted is the sole owner of that resource.

If the component to be deleted is not the sole owner of the resource, the component being deleted is removed from the ownership 64 attribute for that resource but the software or hardware resource is retained.

If at decision block 106, the component to be deleted is the sole owner of the software resource 42, then at process block 108, that row is removed from the available resource table 54 and the software resource 42 is also deleted as indicated by process block 109. In the deletion process, the loader/de-loader program 40 looks first at the component's file location and then at the common area. This deletion will only occur with resources. However, it may be accompanied by a message to the user prompting physical removal of a hardware resource 36.

The program then proceeds to decision block 110 to see if all the rows of the available resource table 54 have been reviewed. If not, the program proceeds to process block 102. If all the rows of the resource table 54 have been reviewed, the program proceeds to process block 112 and then software component 38 is deleted as indicated by process block 112. When the component is hardware, a message instructing the user to remove the hardware can be provided.

It is specifically intended that the present invention not be limited to the embodiments and illustrations contained herein, but modified forms of those embodiments including portions of the embodiments and combinations of elements of different embodiments as come within the scope of the following claims.

We claim:

1. A method of adding a component into a multi-component electronic device, the multi-component electronic device providing a set of shared resources having types and version numbers, the method comprising the steps of:
   (a) determining a required shared resource list of types and version numbers of shared resources required by the component and other components of the multi-component electronic device;
   (b) attaching to the component a link to the required shared resource list;
   (c) executing a loader program upon installation of the component to compare the required shared resource list with the set of shared resources provided by the multi-component electronic device;
      (i) when the entire required shared resource list, including the types and version numbers, match the set of shared resources provided by the multi-component electronic device, adding the component to the multi-component electronic device; and
      (ii) when less than the entire required shared resource list, including the types and version numbers, match the set of shared resources provided by the multi-component electronic device, determining the types and version numbers of the missing shared resources and searching for the missing shared resources according to a predefined search strategy; and installing the missing shared resources on the multi-component electronic device;
   further including the step of:
      (iii) when a missing shared resource found in the search strategy is a shared resource having a type but not a version identical with a corresponding shared resource in the set of shared resources, adding the missing shared resource to the multi-component electronic device without removing the original corresponding shared resource, thus treating the resource as two distinct files even if they have the same name,
   wherein the corresponding shared resource is in a common directory to be usable components other than the component and the new shared resource is placed in a directory different from the directory of the corresponding shared resource and usable by the component.

2. A method of adding a component into a multi-component electronic device, the multi-component electronic device providing a set of shared resources having types and version numbers, the method comprising the steps of:
   (a) determining a required shared resource list of types and version numbers of shared resources required by the component and other components of the multi-component electronic device;
   (b) attaching to the component a link to the required shared resource list;
   (c) executing a loader program upon installation of the component to compare the required shared resource list with the set of shared resources provided by the multi-component electronic device;
      (i) when the entire required shared resource list, including the types and version numbers, match the set of shared resources provided by the multi-component electronic device, adding the component to the multi-component electronic device; and
      (ii) when less than the entire required shared resource list, including the types and version numbers, match the set of shared resources provided by the multi-component electronic device, determining the types and version numbers of the missing shared resources and searching for the missing shared resources according to a predefined search strategy; and installing the missing shared resources on the multi-component electronic device;
   (d) determining upward compatibility between different version numbers of shared resources of a given type, upward compatibility indicating that a shared resource of a later version number fully supports the features of a shared resource with an earlier version number;
   (e) linking the information about the compatibility to the shared resources;
   (f) when a missing shared resource found in the search strategy is a shared resource having a type identical with a corresponding shared resource in the set of shared resources but a later version number, replacing the corresponding shared resource with the missing shared resource only when the missing shared resource is upwardly compatible with the corresponding shared resource.

3. The method of claim 2 wherein the component is a hardware component.

4. The method of claim 2 including the step of (c)(iii) when a missing shared resource is not found in the search strategy, providing a notification to the user of the type and version of the missing shared resources not found.

5. The method of claim 2 wherein the shared resources are selected from a group consisting of: hardware shared resources including hardware and files, and software shared resources including files only.

6. The method of claim 2 wherein the predefined search strategy begins the search with a directory of a source of the component.

7. The method of claim 2 wherein the predefined search strategy includes searching at least one predetermined Internet location.

8. The method of claim 2 wherein the set of shared resources is determined by a program searching the multi-component electronic device prior to step (c).

9. A method of adding a component into a multi-component electronic device, the multi-component electronic device providing a set of shared resources having types and version numbers, the method comprising the steps of:

(a) determining a required shared resource list of types and version numbers of shared resources required by the component and other components of the multi-component electronic device;

(b) attaching to the component a link to the required shared resource list;

(c) executing a loader program upon installation of the component to compare the required shared resource list with the set of shared resources provided by the multi-component electronic device;

(i) when the entire required shared resource list, including the types and version numbers, match the set of shared resources provided by the multi-component electronic device, adding the component to the multi-component electronic device; and (ii) when less than the entire required shared resource list, including the types and version numbers, match the set of shared resources provided by the multi-component electronic device, determining the types and version numbers of the missing shared resources and searching for the missing shared resources according to a predefined search strategy; and installing the missing shared resources on the multi-component electronic device;

(d) determining upward compatibility between different version numbers of shared resources of a given type, upward compatibility indicating that a shared resource with a later version number fully supports the features of a shared resource of an earlier version number;

(e) linking the information about the compatibility to the shared resources;

(f) when a missing shared resource found in the search strategy is a shared resource having a type identical with a corresponding shared resource in the set of shared resources but an earlier version number, using the corresponding shared resource instead of the missing shared resource only when the corresponding shared resource is upwardly compatible with the missing shared resource.

10. A method of adding a component into a multi-component electronic device, the multi-component electronic device providing a set of shared resources having types and version numbers, the method comprising the steps of:

(a) determining a required shared resource list of types and version numbers of shared resources required by the component and other components of the multi-component electronic device;

(b) attaching to the component a link to the required shared resource list;

(c) executing a loader program upon installation of the component to compare the required shared resource list with the set of shared resources provided by the multi-component electronic device;

(i) when the entire required shared resource list, including the types and version numbers, match the set of shared resources provided by the multi-component electronic device, adding the component to the multi-component electronic device; and (ii) when less than the entire required shared resource list, including the types and version numbers, match the set of shared resources provided by the multi-component electronic device, determining the types and version numbers of the missing shared resources and searching for the missing shared resources according to a predefined search strategy; and installing the missing shared resources on the multi-component electronic device;

wherein the set of shared resources is listed in an available shared resource table in the multi-component electronic device and wherein step (c) compares the required shared resource list with the available shared resource table;

wherein the available shared resource table includes a listing of components using each shared resource; further including the step of:

(d) adding a shared resource to the available shared resource table, in the listing of components using each shared resource, for the shared resources of the required shared resource list.

11. The method of claim 10 wherein the available shared resource table is generated at least in part by manual entry of the shared resource.

12. The method of claim 10 wherein the available shared resource table is generated by the step of a program searching the multi-component electronic device.

13. The method of claim 10 wherein the available shared resource table is generated as components are loaded.

14. The method of claim 10 further including the steps of:

(e) accepting a component deletion instruction;

(f) deleting the component from the multi-component electronic device;

(g) reviewing the available shared resource table to find all the shared resources associated with the component; and (h) deleting all shared resources identified in the step (f) unless the available shared resource table indicates a component other than the component being deleted in the listing of components using the shared resource.

15. The method of claim 14 including the step of:

(i) deleting the shared resource from all listing of components associated with shared resources of the available shared resource table.

16. The method of claim 15 further including the step of (j) notifying the user of shared resources identified in the step (f) wherein the available shared resource table indicates a component other than the component being deleted in the listing of components using the shared resource.

17. A multi-component electronic system comprising:

a multi-component device providing a set of shared resources having types and version numbers;

a component suitable for the multi-component device and having a link to a required shared resource list holding types and version numbers of shared resources required by the component;

a loader program executing to:

(i) compare the required shared resource list of a component with the set of shared resources;

(ii) when the entire required shared resource list, including the types and version numbers, match the set of shared resources, allowing addition of the component to the multi-component electronic device; and (iii) when less than the entire required shared resource list, including the types and version numbers, match the set of shared resources, determining the types and version numbers of the missing shared resources and searching for the missing shared resources according to a predefined search strategy and installing the missing shared resources on the multi-component electronic device;

wherein when a missing shared resource found in the search strategy is a shared resource having a type, but not a version identical with a corresponding shared resource in the set of shared resources, the loader program adds the missing shared resource to the multi-component electronic device without removing the corresponding original shared resource; component wherein the corresponding shared resource is in a common directory to be usable components other than the component and the new shared resource is placed in a directory different from the directory of the corresponding shared resource and usable by the component.

18. A multi-component electronic system comprising:
a multi-component device providing a set of shared resources having types and version numbers;
a component suitable for the multi-component device and having a link to a required shared resource list holding types and version numbers of shared resources required by the component;
a loader program executing to:
(i) compare the required shared resource list of a component with the set of shared resources;
(ii) when the entire required shared resource list, including the types and version numbers, match the set of shared resources, allowing addition of the component to the multi-component electronic device; and
(iii) when less than the entire required shared resource list, including the types and version numbers, match the set of shared resources, determining the types and version numbers of the missing shared resources and searching for the missing shared resources according to a predefined search strategy and installing the missing shared resources on the multi-component electronic device;
wherein the shared resources link to information about upward compatibility between different version numbers of shared resources of a given type, upward compatibility indicating that a shared resource of a later version number fully supports the features of a shared resource with an earlier version number;
and wherein when a missing shared resource found by the loader program in the search strategy is a shared resource having a type identical with a corresponding shared resource in the set of shared resources but a later version number, the loader program replaces the corresponding shared resource with the missing shared resource only when the missing shared resource is upwardly compatible with the corresponding shared resource.

19. The multi-component electronic system of claim 18 wherein the component is a hardware component.

20. The multi-component electronic system of claim 18 wherein the loader program further provides a notification to the user of the type and version of the missing shared resources not found.

21. The method of claim 18 wherein the shared resources are selected from a group consisting of: hardware shared resources including hardware and files, and software shared resources including files only.

22. The multi-component electronic system of claim 18 wherein the predefined search strategy begins the search with a directory of a source of the component.

23. The multi-component electronic system of claim 18 wherein the predefined search strategy includes searching at least one predetermined Internet location.

24. The multi-component electronic system of claim 18 wherein the loader program searches the multi-component electronic device to determine the set of shared resources.

25. A multi-component electronic system comprising:
a multi-component device providing a set of shared resources having types and version numbers;
a component suitable for the multi-component device and having a link to a required shared resource list holding types and version numbers of shared resources required by the component;
a loader program executing to:
(i) compare the required shared resource list of a component with the set of shared resources;
(ii) when the entire required shared resource list, including the types and version numbers, match the set of shared resources, allowing addition of the component to the multi-component electronic device; and
(iii) when less than the entire required shared resource list, including the types and version numbers, match the set of shared resources, determining the types and version numbers of the missing shared resources and searching for the missing shared resources according to a predefined search strategy and installing the missing shared resources on the multi-component electronic device;
wherein the shared resources link to information about upward compatibility between different version numbers of shared resources of a given type, upward compatibility indicating that a shared resource with a later version number fully supports the features of a shared resource of an earlier version number;
and wherein when a missing shared resource found by the loader program in the search strategy is a shared resource having a type identical with a corresponding shared resource in the set of shared resources but an earlier version number, the loader program uses the corresponding shared resource instead of the missing shared resource only when the corresponding shared resource is upwardly compatible with the missing shared resource.

26. A multi-component electronic system comprising:
a multi-component device providing a set of shared resources having types and version numbers:
a component suitable for the multi-component device and having a link to a required shared resource list holding types and version numbers of shared resources required by the component;
a loader program executing to:
(i) compare the required shared resource list of a component with the set of shared resources;
(ii) when the entire required shared resource list, including the types and version numbers, match the set of shared resources, allowing addition of the component to the multi-component electronic device; and
(iii) when less than the entire required shared resource list, including the types and version numbers, match the set of shared resources, determining the types and version numbers of the missing shared resources and searching for the missing shared resources according to a predefined search strategy and installing the missing shared resources on the multi-component electronic device;
wherein the set of shared resources is listed in an available shared resource table in the multi-component electronic device and wherein the loader program compares the required shared resource list with the available shared resource table;
wherein the available shared resource table includes a listing of components using each shared resource; and
wherein the loader program adds a shared resource to the available shared resource table, in the listing of components using each shared resource, for the shared resources of the required shared resource list.

27. The multi-component electronic system of claim 26 wherein the available shared resource table is generated at least in part by manual entry of the shared resource.

28. The multi-component electronic system of claim 26 wherein the loader program updates the available shared resource table as components are loaded.

29. The multi-component electronic system of claim 26 wherein the loader program further:
 (iv) accepts a component deletion instruction;
 (v) deletes the component from the multi-component electronic device;
 (vi) reviews the available shared resource table to find all the shared resources associated with the component; and
 (vii) deletes all shared resources identified in the step (vi) unless the available shared resource table indicates a component other than the component being deleted in the listing of components using the shared resource.

30. The multi-component electronic system of claim 29 wherein the loader program further deletes the shared resource from all listing of components associated with shared resources of the available shared resource table.

31. The multi-component electronic system of claim 30 wherein the loader program further notifies the user of shared resources identified in the step (vi) wherein the available shared resource table indicates a component other than the component being deleted in the listing of components using the shared resource.

* * * * *